United States Patent Office 3,328,331
Patented June 27, 1967

3,328,331
EPOXY RESIN MASSES AND PROCESS FOR
PREPARING THEM
Guido Max Rudolf Lorentz, Oes Post Espa, near Butzbach, Werner Matheis, Schwalbach, Taunus, Helmut Neises, Kelkheim, Taunus, and Rudolf Stroh, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Jan. 20, 1964, Ser. No. 338,623
Claims priority, application Germany, Jan. 22, 1963,
F 38,820
6 Claims. (Cl. 260—30.4)

The present invention relates to epoxy resin masses and to a process for preparing them.

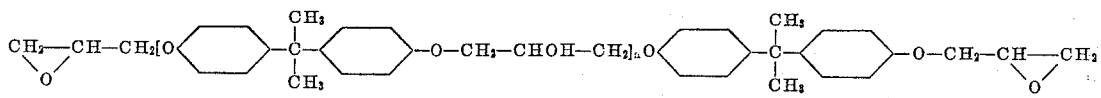

Epoxy resins, i.e. reaction products from epichlorohydrin and substances containing hydroxyl groups, preferably bisphenol A, are viscous substances as far as they are not solid bodies. However, for various technical purposes a lower viscosity of the resins is desired. This reduction of the viscosity has hitherto been achieved by adding solvents, for example xylene, furfuryl alcohol, acetone, ethyl acetate or chloroform.

Particularly when using epoxy resins together with fillers, i.e. generally silicates, and hardeners based on polyamines, for preparing fleximer jointless flooring it is necessary in order to achieve a better workability to add to the foundation material solvents, for example xylene, as diluents. Besides improving the workability the addition of solvents also makes it possible to add to the mass a larger amount of the filler. After the hardening process a considerable quantity of the diluent remains in the mass. However, the greater part of these solvent portions remanent in the mass gradually evaporates. It is possible that this evaporation takes place in the course of several months and even of 1 year, and it is easy to understand that the period of time in which the solvent evaporates from the mass depends to a large extent on the vapor pressure of the solvent. It is obvious that the evaporation of solvents from the hardened mass involves a shrinkage which may gradually cause crack growth in the epoxy resins. Besides the drawbacks that are due to the shrinkage of the mass caused by the evaporation of the solvents, hardened epoxy resin masses which had to be hardened in the presence of a solvent also have an inferior resistance to chemicals and to solvents, an elevated thermal expansion and a reduced "heat distortion point" (Irving Skeist "Epoxy Resins," page 33 (Reinhold Publishing Corporation, New York, 1959).

Furthermore, the annoyances due to odour that are caused by the solvents and their toxic properties have extremely serious drawbacks in the working of epoxy resin masses containing volatile solvents.

Now we have found that there can be obtained an extremely important reduction of viscosity by adding to epoxy resins cyclic ethers of the general formula

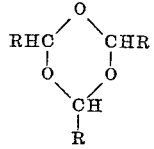

in which R means a hydrogen atom or an alkyl group, preferably a methyl group, and that after the hardening process these masses do not have the undesired properties of epoxy resins mentioned above which contained the solvents generally used up to now.

The process of the present invention is particularly appropriate in the case of epoxy resins which are obtained by reacting epichlorohydrin with:

(1) 4,4'-dihydroxy-2,2-diphenyl-propane ("bisphenol A")
(2) a condensation product of o-cresol and formaldehyde which contains 90–95% of a product obtained by reacting 2 mols of o-cresol and 1 mol of formaldehyde
(3) phenol resins, particularly novolaks or
(4) aliphatic polyhydroxy compounds.

There are preferably used the resins obtained by the condensation of bisphenol A with epichlorohydrin and/or 1,3-dichlorohydrin in the presence of alkalis, which have the following formula

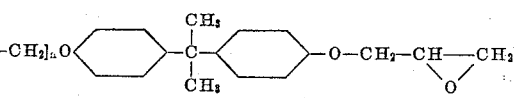

In general it is advantageous to add the cyclic ethers used for the reduction of viscosity to the epoxy resin in a quantity such that in 100 parts by weight of the mixture composed of cyclic ether and epoxy resin 1–30 parts by weight of the cyclic ether are contained. The most advantageous quantity of cyclic ether to be added can be determined without difficulty by a preliminary test. There are preferred mixtures containing in 100 parts by weight 5–20 parts by weight of the cyclic ether.

The excellent reduction of viscosity obtained by the addition of cyclic ethers to epoxy resins is illustrated by the following table:

REDUCTION OF VISCOSITY OF EPOXY RESINS

| Composition of the resin | Epoxy value* of the initial resin | Viscosity in centipoises |
|---|---|---|
| 100 parts by weight of epoxy resin from bisphenol A and epichlorohydrin. | 0.545 | 26,500 at 20° C. |
| 85 parts by weight of epoxy resin, 15 parts by weight of xylene. | 0.545 | 600 at 20° C. |
| 90 parts by weight of epoxy resin, 10 parts by weight of trioxane. | 0.545 | 1,800 at 20° C. |
| 85 parts by weight of epoxy resin, 15 parts by weight of trioxane. | 0.545 | 990 at 20° C. |
| 80 parts by weight of epoxy resin, 20 parts by weight of trioxane. | 0.545 | 420 at 20° C. |
| 85 parts by weight of epoxy resin, 15 parts by weight of paracetaldehyde. | 0.545 | 700 at 20° C. |
| 100 parts by weight of epoxy resin from bisphenol A and epichlorohydrin. | 0.38 | 52,300 at 50° C. |
| 80 parts by weight of epoxy resin, 20 parts by weight of trioxane. | 0.38 | 1,000 at 50° C. |

*Epoxy value=mols of epoxy groups in 100 g. of resin.

For hardening the masses according to the present invention there are used the polyamines generally applied for hardening epoxy resins, for example diethylene diamine, diethylene triamine, triethylene tetramine, m-phenylenediamine, hydrogenated m - phenylene diamine, aminoethyl-piperazine and polymers of polyvalent alkylene amines according to German Auslegeschrift No. 1,139,268.

The improvement of the mechanical properties and of the resistance to chemicals of the foundation materials that contain as diluent instead of a solvent the additive according to the present invention was determined by means of testing bodies composed of a foundation material which contained as epoxy resin a condensation product of epichlorohydrin and bisphenol A having an epoxy value of 0.545 and a viscosity (undiluted) of 26,500 centipoises at 20° C., as hardener a polyamine having an amine equivalent of 40 and, as filler, quartz powder of the following grain composition:

| | Percent |
|---|---|
| 2–1 mm. | 6 |
| 1–0.75 mm. | 19 |
| 0.75–0.3 mm. | 9 |
| 0.3–0.15 mm. | 26 |
| 0.15–0.1 mm. | 10 |
| <0.1 mm. | 30 |

There were used as diluents trioxane (trioxymethylene) and paraldehyde (trimethyl-trioxane). For reasons of comparison there are mentioned the values obtained when using testing bodies having the same basic composition, containing, however, xylene as diluent.

The testing bodies were stored at the air for 7 days at about 20° C. (room temperature) before the test.

For determining the resistance to chemicals the testing bodies obtained were refluxed for 8 hours in the liquids mentioned in the table then they were rinsed, dried in a drying chamber at 100° C., and then the difference in weight was determined by weighing.

The values obtained are indicated in the following table, the respective composition of the foundation materials being shown in the 1st column:

As is shown by the results indicated in Table 2, the mechanical and chemical properties of epoxy resin masses are considerably improved by an addition of cyclic ethers. When using paracetaldehyde the improvement of the mechanical properties is inferior, but there are obtained also in this case masses that have a considerably increased resistance to chemicals. The optimum results were obtained by adding 10% of trioxane.

The use of the trioxane that is added according to the present invention instead of the solvents hitherto used for the reduction of viscosity of epoxy resins also has a favourable effect on the behaviour of the hardened resin when exposed to thermal stress as is illustrated by the following comparison test:

A mixture was prepared of 85 parts by weight of epoxy resin, 21.25 parts by weight of polyamine hardener and 15 parts by weight of diluent and there were used as epoxy resin and as hardener the same products as for carrying out the tests described above. As diluent there was used in one case xylene, in the other case trioxane (trioxymethylene).

This mixture was cast into plates of 30 x 30 x 0.5 cm. which were completely hardened in both cases after 24 hours.

The plates thus obtained were heated in a drying chamber at 60° C. The plate prepared with the addition of xylene already had numerous shrinkage cracks after 3 hours. The plate which was prepared with the addition of trioxane, however, could be stored for several hours, at 60° C. without appearance of damages. It was not even damaged or destroyed when heated to 100° C. for more than 1 week. When exposed to suddenly changed temperatures the plate showed an excellent stability which was such that it could be chilled from 100° C. to 15° C. by plunging it several times into cold water without its undergoing damages. Furthermore, practically no loss of weight could be observed after its exposure to the temperature treatment.

The dilution without solvents of epoxy resins with the compounds mentioned above is not only of interest as to the preparation of foundation material, but also when using epoxy resins as coating material, for impregnating processes and as casting resins; by impregnating processes there are meant in the first line the combinations of liquid epoxy resins with glass or asbestos fibres.

We claim:

1. In the reduction of the viscosity of epoxy resin the improvement which comprises adding a trioxane of the general formula

TABLE 2

| Composition | Compressive strength, kg. cm.² | Tensile strength, kg./cm.² | HCl, 20% | NaOH, 15% | Acetic acid | H₂SO₄, 20% | Diesel oil | Acetone | Benzene | Gasoline |
|---|---|---|---|---|---|---|---|---|---|---|
| Epoxy resin (0.545 epoxy value), 85 parts by weight, xylene, 15 parts by weight; polyamine hardener, 21.25 parts by weight, quartz powder, 630 parts by weight | 482 | 76 | −0.3 | −0.53 | −0.48 | +0.6 | −0.95 | −0.82 | −0.49 | −0.34 |
| Epoxy resin (0.545 epoxy value), 85 parts by weight, trioxane, 15 parts by weight; polyamine hardener, 21.25 parts by weight, quartz powder, 630 parts by weight | 643 | 90 | −0.12 | −0.28 | −0.29 | +0.27 | −0.47 | −0.39 | −0.30 | −0.22 |
| Epoxy resin (0.545 epoxy value), 90 parts by weight, trioxane, 10 parts by weight; polyamine hardener, 21.5 parts by weight, quartz powder, 630 parts by weight | 800 | 170 | −0.03 | −0.26 | −0.20 | +0.4 | −0.15 | −0.27 | −0.20 | −0.10 |
| Epoxy resin (0.545 epoxy value), 80 parts by weight, trioxane, 20 parts by weight; polyamine hardener, 20 parts by weight, quartz powder, 630 parts by weight | 570 | 88 | −0.3 | −0.80 | −0.22 | −0.9 | −0.6 | −0.89 | −0.8 | −0.48 |
| Epoxy resin (0.545 epoxy value), 85 parts by weight; polyamine hardener, 21.25 parts by weight, paraldehyde, 15 parts by weight, quartz powder, 630 parts by weight | 500 | 78 | −0.2 | −0.29 | −0.34 | −0.3 | −0.45 | −0.69 | −0.47 | −0.23 |

Resistance to chemicals indicated in percent of loss or increase of weight (determined by the method indicated above).

$$\begin{array}{c} O \\ CHR \diagup \diagdown CHR \\ | \quad\quad | \\ O \quad\quad O \\ \diagdown \diagup \\ CHR \end{array}$$

in which R represents a member selected from the group consisting of hydrogen and an alkyl group.

2. An epoxy resin composition comprising a liquid diglycidyl ether of polyhydric aromatic alcohols and as a viscosity reducer a trioxane of the general formula

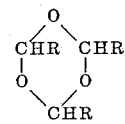

wherein R is a member selected from the group consisting of hydrogen and an alkyl.

3. A composition according to claim 2 wherein per 100 parts by weight of the mixture consisting of epoxy resin and trioxane 1 to 30 parts by weight is the trioxane.

4. The composition according to claim 2 wherein per 100 parts by weight of the mixture consisting of the epoxy resin and the trioxane 5 to 20 parts by weight is the trioxane.

5. A hardenable epoxy resin composition comprising a liquid diglycidyl ether of polyhydric aromatic alcohols, a trioxane as a viscosity reducer for said ether and an amine hardening agent.

6. A hardenable epoxy resin composition comprising a liquid diglycidyl ether of polyhydric aromatic alcohols and a trioxane as a viscosity reducer, said trioxane being of the formula

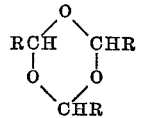

wherein R is a member selected from the group consisting of hydrogen and an alkyl, and a polyamine hardening agent.

References Cited

UNITED STATES PATENTS

| 2,947,726 | 8/1960 | Belanger | 260—30.4 |
| 3,027,352 | 3/1962 | Walling et al. | 260—67 |
| 3,050,474 | 8/1962 | Russell | 260—30.4 |
| 3,072,607 | 1/1963 | Fisch et al. | 260—30.4 |

MORRIS LIEBMAN, *Primary Examiner.*

J. E. CALLAGHAN, *Assistant Examiner.*